(12) United States Patent
Domergue

(10) Patent No.: US 7,530,417 B2
(45) Date of Patent: May 12, 2009

(54) ASSEMBLY FOR ADMITTING COMBUSTION AIR FOR A MOTORCYCLE, AND A MOTORCYCLE FITTED WITH SUCH AN ASSEMBLY

(75) Inventor: Joel Leon Robert Domergue, Aniane (FR)

(73) Assignee: Engineering and More, Aniane (FR)

( * ) Notice: Subject to any disclaimer, the term of this patent is extended or adjusted under 35 U.S.C. 154(b) by 171 days.

(21) Appl. No.: 11/802,047

(22) Filed: May 18, 2007

(65) Prior Publication Data

US 2007/0272198 A1    Nov. 29, 2007

(30) Foreign Application Priority Data

May 23, 2006    (FR) .................................. 06 04606

(51) Int. Cl.
*F02B 77/00*    (2006.01)
(52) U.S. Cl. ...................... 180/68.3; 180/296; 180/226; 180/219; 180/68.1; 180/227
(58) Field of Classification Search ................. 180/296, 180/68.3, 226, 219, 68.1, 227
See application file for complete search history.

(56) References Cited

U.S. PATENT DOCUMENTS

| | | | | |
|---|---|---|---|---|
| 5,307,771 | A * | 5/1994 | Stahel et al. ............. | 123/198 E |
| 6,422,201 | B1 * | 7/2002 | Yamada et al. .............. | 123/336 |
| 7,051,824 | B1 * | 5/2006 | Jones et al. ................. | 180/68.3 |
| 7,114,476 | B1 * | 10/2006 | Wimmer ................. | 123/184.21 |
| 7,401,590 | B2 * | 7/2008 | Schmidt et al. .......... | 123/198 E |

FOREIGN PATENT DOCUMENTS

| | | |
|---|---|---|
| EP | 1464824 | 10/2004 |
| JP | 62046795 | 2/1987 |
| JP | 02028074 | 1/1990 |
| JP | 2000355292 | 12/2000 |
| JP | 2002160686 | 6/2002 |

\* cited by examiner

*Primary Examiner*—Christopher P Ellis
*Assistant Examiner*—Cynthia F Collado
(74) *Attorney, Agent, or Firm*—Dowell & Dowell, PC

(57) ABSTRACT

The assembly (10) for admitting combustion air to the engine of a motorcycle comprises:
an air filter (12);
a housing (11) for mounting at the top portion of the motorcycle and forming a support for the air filter (12);
an air inlet module (13) fitted to the housing and including at least one movable shutter (131, 131');
control means for controlling the movements of the shutter (131, 131'); and
assembly means (17, 171-174) for assembling the assembly at the top portion (21) of the motorcycle.

The air filter (12) is generally annular and subdivides the inside volume of the housing (11) into a radially inner chamber and a radially outer chamber. The radially inner chamber is fed with air through the air inlet module (13), while the radially outer chamber forms, around the air filter (12), a chamber for stabilizing the flow of air downstream from the filter.

10 Claims, 5 Drawing Sheets

ASSEMBLY FOR ADMITTING COMBUSTION AIR FOR A MOTORCYCLE, AND A MOTORCYCLE FITTED WITH SUCH AN ASSEMBLY

The invention relates to an assembly for admitting combustion air to the engine of a motorcycle. The invention also relates to a motorcycle fitted with such an air admission assembly.

In the field of motorcycles, U.S. Pat. No. 5,307,771 discloses placing an air filter on the path of combustion air for an internal combustion engine, the filter serving to prevent or limit the penetration of impurities into the cylinder(s) of the engine. With certain motorcycles of large cylinder capacity, such an air filter is placed on one side of the engine close to one of the rider's knees, which can be awkward for the rider. In addition, given this positioning of the air filter on the side of the motorcycle, the protective housing in which it is generally received needs to be of a volume that is as small as possible in order to avoid interfering with the general streamlining of the motorcycle. Under such conditions, it is not unusual for the flow of filtered air heading towards the engine to be unstable or turbulent, to such an extent as to impede combustion. In particular, U.S. Pat. No. 5,307,771 provides for air to flow from the outside towards the inside of the air filter, which is essential for enabling it to be fed via a second opening formed in a wall of the housing.

JP-A-62 046 795 discloses a housing that appears to be provided with an inlet opening that is fitted with a flap and with outlet tubes. The shape and the position of an air filter inside the housing are not disclosed and the air penetrating into the housing runs the risk of leaving it in the form of a turbulent flow, particularly since the housing needs to be compact in order to be suitable for being housed in a central recess in the fuel tank of a motorcycle.

The present invention seeks more particularly to remedy those drawbacks by proposing a novel assembly for admitting combustion air to the engine of a motorcycle, which assembly enables the flow of filtered air to be stabilized, without getting in the way of the rider and without significantly disturbing the streamlining of the motorcycle.

To this end, the invention relates to an assembly for admitting oxidized air to the engine of a motorcycle, the assembly comprising:

an air filter;

a tube for taking air from the air filter to the engine;

a housing designed to be mounted in the top portion of the motorcycle and forming a support for the air filter;

an air inlet module fitted to the housing and having at least one shutter movable between a first position in which it shuts an inlet for allowing air to flow towards an inside zone of the housing, situated upstream from the air filter, and a second position in which it allows air to flow into the air opening towards the inside zone of the housing;

control means for controlling the movements of the shutter between its first and second positions; and assembly means for mounting the assembly at the top portion of the motorcycle.

The assembly is characterized in that the air filter is generally annular in shape and, when it is disposed inside the housing it subdivides the inside volume of the housing into a radially inner chamber and a radially outer chamber, in that the radially inner chamber is fed with air through the air inlet module, and in that the radially outer chamber forms around the air filter a chamber for stabilizing the flow of air downstream from the air filter.

The air admission assembly in accordance with the invention can be located in front of the rider in the volume that is conventionally occupied by the fuel tank, with said volume being large enough to enable the stabilization chamber, which is located inside the housing and downstream from the air filter, to act effectively. The air inlet module can thus be disposed on top of the air admission assembly, in a zone of substantially laminar air flow around the motorcycle.

According to aspects of the invention that are advantageous but not essential, an air admission assembly may incorporate one or more of the following characteristics:

the air filter is annular and subdivides the inside volume of the housing into two portions, namely the above-mentioned upstream zone that is situated radially inside the filter, and the above-mentioned stabilization chamber situated radially outside the filter;

the tube is disposed between the stabilization chamber and the engine and it is fitted with at least one shutter movable between a first position in which it shuts the tube, and a second position in which it allows a flow inside the tube;

means are provided that are distinct from the air inlet module and that enable air to be fed to the inner zone even when the shutter of the air inlet module is in its first position for shutting the air flow opening; and the assembly means comprise means for holding the assembly securely on a beam of the frame of the motorcycle that is situated over the engine. The assembly means may include a plate suitable for being fitted on the beam and for supporting the housing fitted with the module. Under such circumstances, the assembly means advantageously include a screw and a complementary tapped hole carried respectively by the air inlet module and by the plate, or vice versa, the screw and/or a member provided with the tapped hole extending through the upstream zone of the housing and enabling the module and the plate to be assembled together by screw-fastening, the housing being interposed between them.

The invention also provides a motorcycle fitted with an air admission assembly as described above, the assembly being installed generally between the seat and the handlebar of the motorcycle, over the engine, the stabilization chamber being disposed generally symmetrically about a vertical midplane of the motorcycle.

Such a motorcycle is more agreeable to ride, whereas combustion air is fed to its engine in more regular manner than in prior art motorcycles.

According to aspects of the invention that are advantageous but not essential, a motorcycle may incorporate one or both of the following characteristics:

the air inlet module is disposed on the top of the housing, with its opening(s) facing towards the front of the motorcycle; and the air admission assembly occupies substantially the volume occupied by the fuel tank of a conventional motorcycle.

The invention can be better understood and other advantages thereof appear more clearly in the light of the following description of an embodiment of an air admission assembly and of a motorcycle in accordance with the principle of the invention, given purely by way of example and made with reference to the accompanying drawings, in which.

Figure 1:
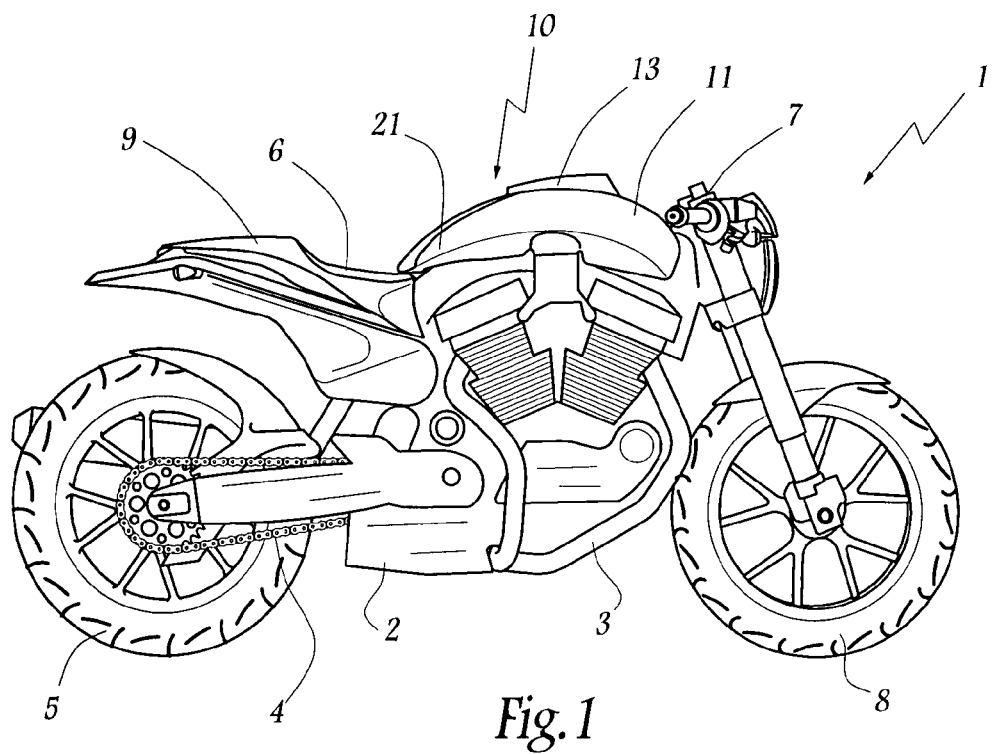
FIG. 1 is a side view of a motorcycle in accordance with the invention incorporating an air admission assembly in accordance with the invention.

The motorcycle 1 shown in the figures comprises a frame 2 that supports an internal combustion engine 3. A top beam 21 of the frame 2 extends over the engine 3 and serves to retain, in particular, the fork of the motorcycle 1.

In conventional manner, the engine 3 drives a chain 4 which in turn drives the rear wheel 5 of the motorcycle.

The motorcycle includes a seat 6 and a handlebar 7 for steering the front wheel 8 of the motorcycle.

The tank 9 containing the fuel used in the engine 3 is situated generally under the seat 6 and is accessible through a hatch 91 disposed at the rear of the seat.

Figure 2:
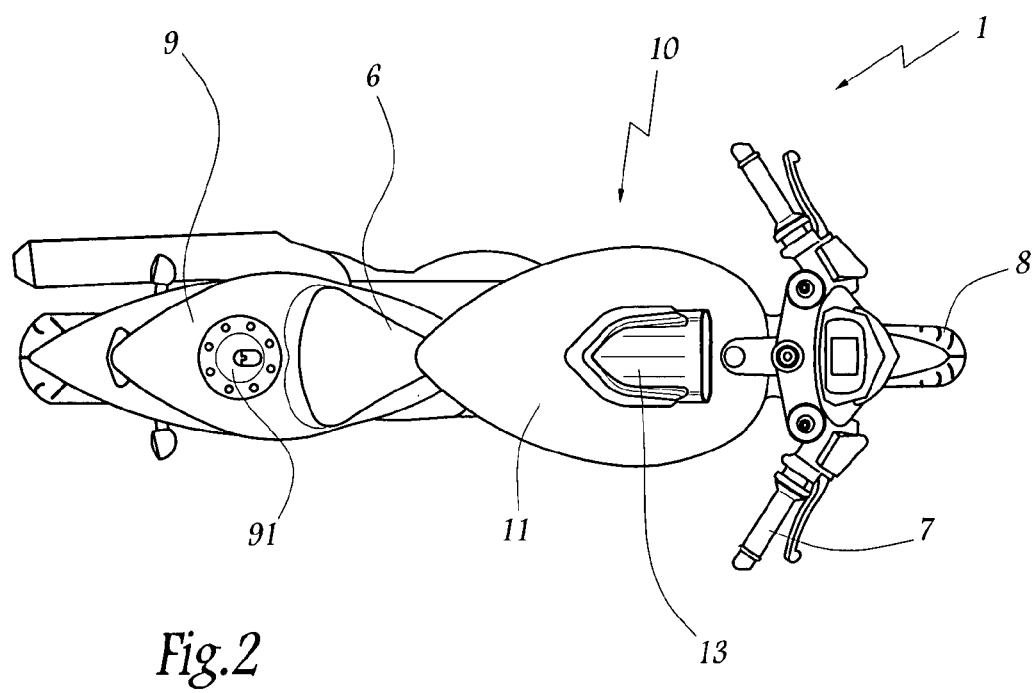
FIG. 2 is a plan view of the FIG. 1 motorcycle.
Figure 3:
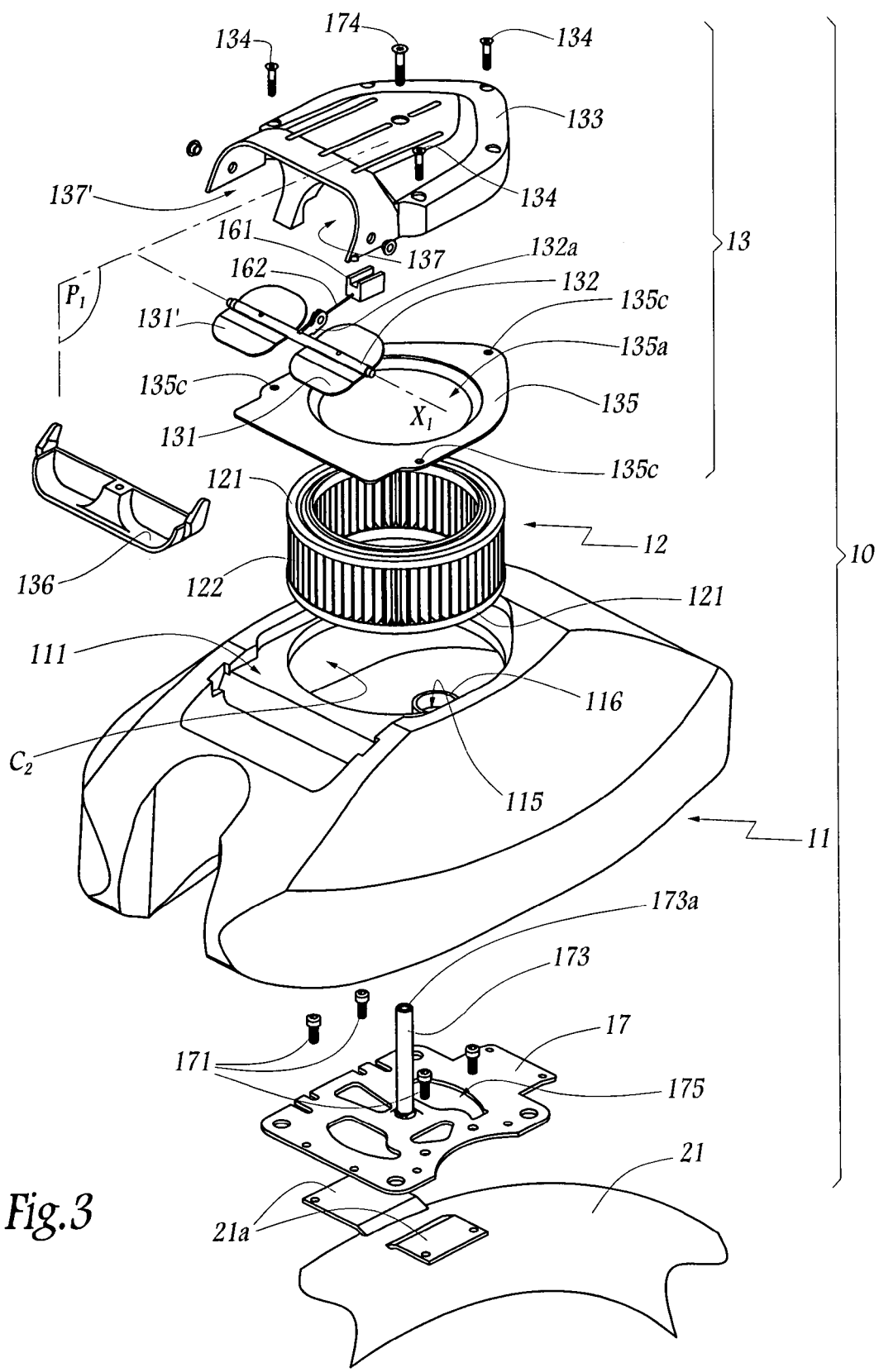
FIG. 3 is an exploded perspective view of the air admission assembly of the motorcycle of FIGS. 1 and 2.

An assembly for admitting oxidizing air into the engine 3 is disposed between the seat 6 and the handlebar 7. This assembly 10 extends over the engine 3 in such a manner as to be generally symmetrical about a midplane $P_1$ of the motorcycle, which plane is vertical when the motorcycle is in the configuration of FIGS. 1 and 2. The assembly 10 is supported by the beam 21.

The assembly 10 serves to feed the engine 3 with air for combustion, or combustion air, in controlled and optimized manner.

The assembly 10 comprises a housing 11 obtained by molding a plastics material, e.g. polyethylene, and in which there is disposed an air filter 12 of generally annular shape. The filter comprises two support rings 121 and a filter medium 122.

Once placed in the housing 11, the filter 12 subdivides the inside volume of the housing 11 into an inner chamber $C_1$ and an outer chamber $C_2$, these chambers being disposed respectively radially inside and outside the filter 12.

The chamber $C_1$ is fed with air through a module 13 that is mounted at the top portion of the housing 11 and that is fitted with two shutters in the form of flaps 131 and 131' mounted to pivot about an axis $X_1$ perpendicular to the plane $P_1$ and embodied by a shaft 132 provided with an actuation tab 132a. The shaft 132 is mounted to pivot on an aluminum shell 133 fastened on the housing 11.

A sealing plate 135 is interposed between the shell 133 and the hollow recess 111 formed in the top portion of the housing 11 for receiving the module 13. The plate 135 is provided with a central circular opening 135a of a diameter that is selected as a function of the characteristics of the engine 3. The plate 135 covers the top ring 121 of the filter 12 when the assembly 10 is in its assembled configuration, as shown in FIG. 5.

The module 13 also includes an aluminum element 136 complementary to the shell 133 and designed to be fitted thereto so as to define two openings 137 and 137' in which the flaps 131 and 131' are respectively located.

The plate 135 is provided with holes 135c for receiving self-tapping screws 134 engaged in holes in the shell 133 so that the module 13 can be assembled by association the parts 131 to 135 and then tightening the screws 134.

Figure 4:
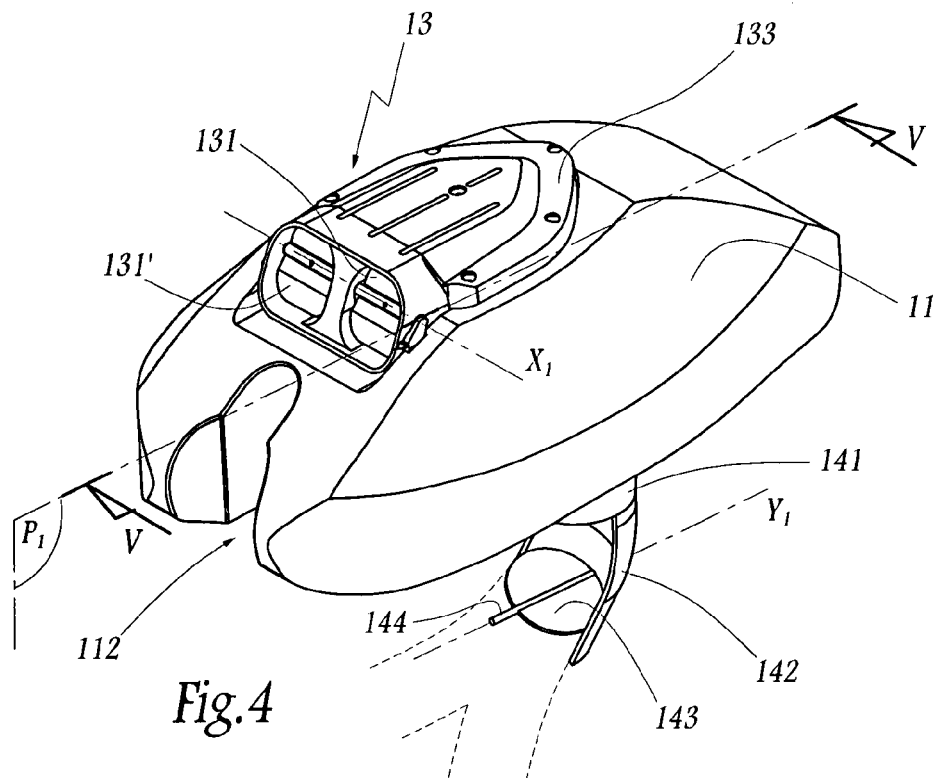
FIG. 4 is a perspective view of the FIG. 3 assembly in a first configuration.
Figure 6:
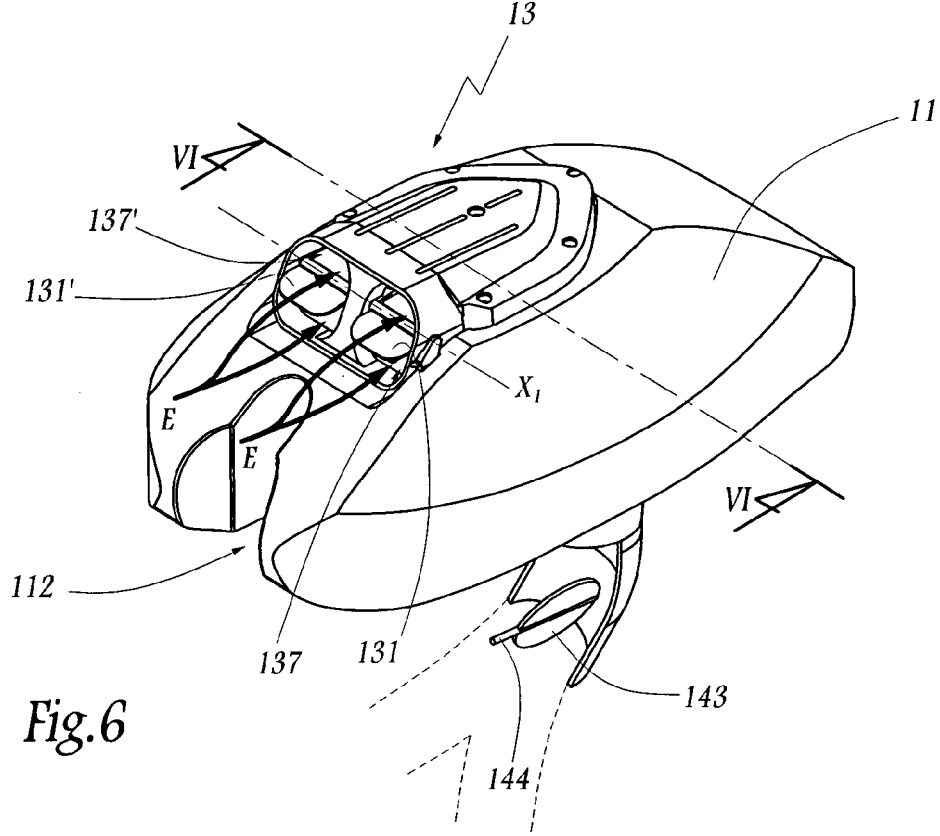
FIG. 6 is a view analogous to FIG. 4, the assembly being in another configuration.
Figure 5:
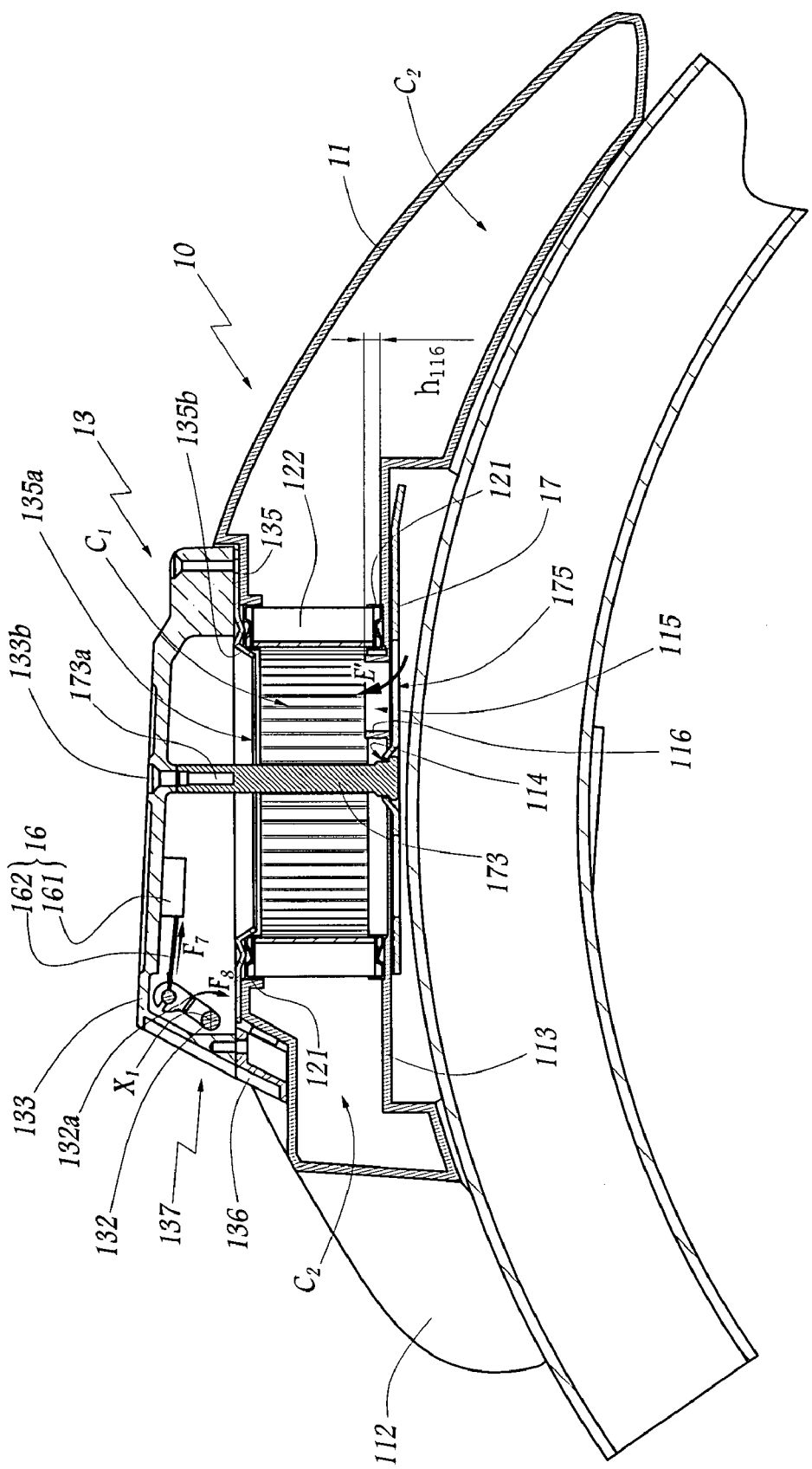
FIG. 5 is a longitudinal view in section on line V-V of FIG. 4, and on a larger scale.

As can be seen more particularly by comparing FIGS. 4 and 6, the flaps 131 and 131' can pivot about the axis $X_1$ between the position of FIGS. 4 and 5, in which each of them closes the corresponding opening 137 or 137', and the position of FIG. 6 in which they allow a flow E of air to pass towards the inside of the shell 133 and towards the chamber $C_1$, through the opening 135a.

Figure 7:
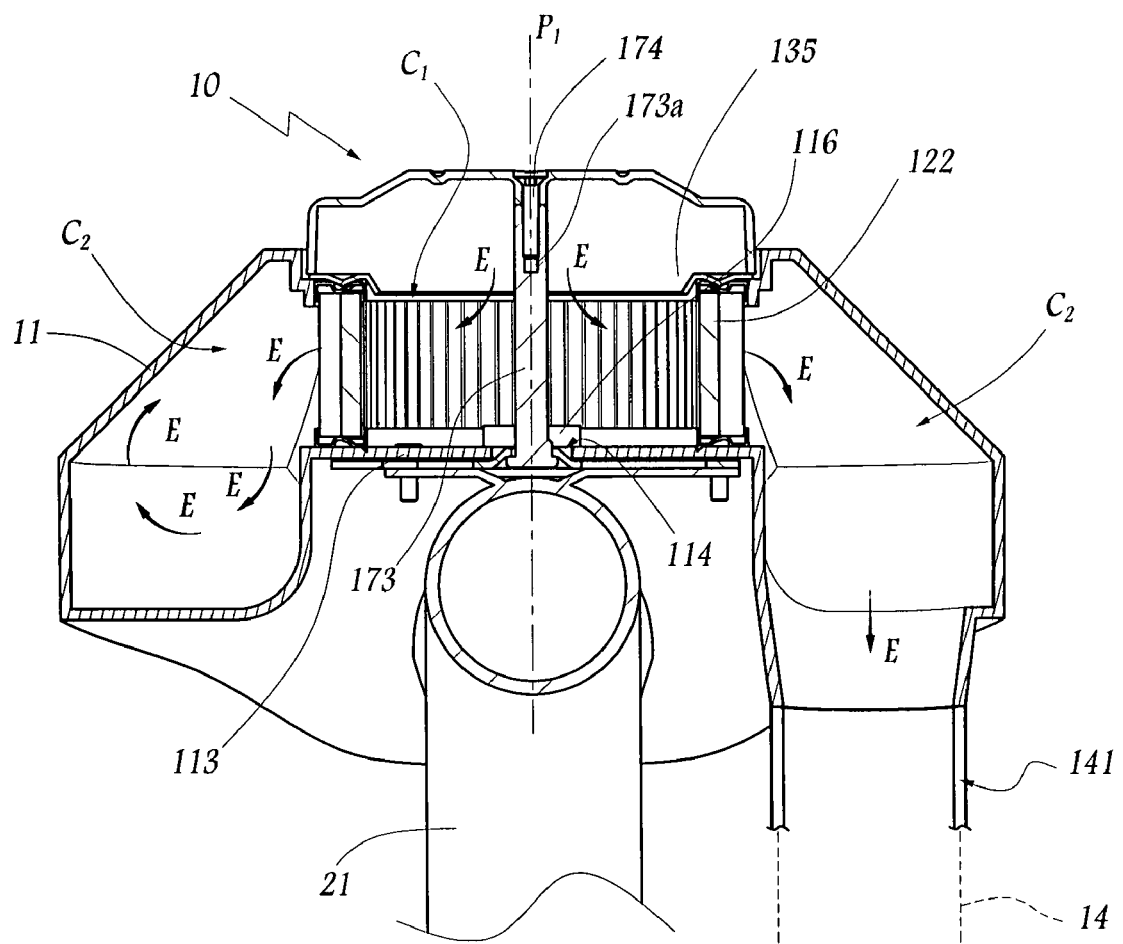
FIG. 7 is a section view on line VII-VII of FIG. 6, and on a larger scale.

As can be seen in FIG. 7, the flow E then passes through the filter medium 122 and reaches the chamber $C_2$ where it is stabilized, given the relatively large volume of the chamber $C_2$. From this chamber, the flow E penetrates into a tube 14 formed of a bent elastomer sleeve 141 and of a Y-shaped tube 142 having a shutter or flap 143 in its common branch for controlling the admission of air to the carburetors of the two cylinders of the engine 3, which are connected respectively to the two outlet branches of the Y-shaped tube 142. In order to clarify the drawings, only a portion of the tube 14 is shown, in highly diagrammatic manner, in FIG. 7.

The flap 143 is in the form of a disk and its diameter matches the inside diameter of the Y-shaped tube 142.

The flap 143 is pivotally movable about an axis $Y_1$ that is generally parallel to the plane $P_1$ and embodied by a pivotally-mounted shaft 144 extending across the Y-shaped tube 142.

The assembly 10 is mounted on the motorcycle in such a manner that the openings 137 and 137' face forwards, i.e. beside a notch 112 formed in the housing 11 to accommodate the tube of the frame 2 relative to which the fork of the motorcycle pivots. The assembly 10 thus occupies the volume usually used for the fuel tank in conventional motorcycles. This is made possible by the fact that the tank 9 is provided under the seat 6. The volume available for the housing 11 is thus comparable with the volume conventionally allocated to the fuel tank, such that the chamber $C_2$ can have a volume of several liters, and in particular a volume greater than 10 liters.

The shape and the outside appearance of the housing 11 can be defined with greater freedom than is possible for the fuel tanks of conventional motorcycles since they sometimes need to integrate fuel pumps or other accessories. The only real constraint is that the inside volume of the hosing should be great enough to form a chamber $C_2$ for stabilizing the flow of air that matches the requirements of the engine 3.

The assembly 10 is symmetrical about the plane $P_1$, except insofar as the bent tube 14 is provided on one side only of the motorcycle 1. The plane $P_1$ is vertical when the motorcycle is in its normal utilization configuration.

In operation, i.e. when the motorcycle is moving forwards, the forward facing openings 137 and 137' enable the flow of air around the motorcycle to penetrate naturally into the chamber $C_1$ while remaining laminar, in the form of the flow E, providing the flaps 131 and 131' are tilted from their positions shown in FIG. 4 towards their positions shown in FIG. 6.

In this configuration, the portions of the flaps 131 and 131', that project ahead of the openings 137 and 137'when in the fully-open position, serve to guide air towards said openings.

The movement of the flaps 131 and 131' between their FIG. 4 configuration and their FIG. 6 configuration is controlled by means of an electromagnet 161 that is itself controlled as a function of the speed of the engine 3 and that is located under the top face of the shell 133. When the electromagnet 161 is excited, it acts on a link 162 attached to the tab 132a so as to exert a traction force $F_7$ tending to cause the flaps 131 and 131' to tilt in the direction of arrow $F_8$.

The electromagnet 161 and the link 162 thus constitute means 16 for controlling the movements of the flaps 131 and 131', it being understood that a spring (not shown) can be included in the electromagnet 161 in order to return the flaps by default into the configuration of FIG. 4.

Operation is satisfactory when the electromagnet is controlled in binary manner, corresponding to two operating configurations for the flaps 131 and 131', namely the completely closed configuration shown in FIG. 4 and the completely open configuration shown in FIG. 6. Nevertheless, proportional control of the position of the flaps 131 and 131' can be envisaged by suitably controlling the electromagnet.

In practice, the electromagnet is controlled by an appropriate electronic control unit (ECU), itself connected to a probe for measuring the temperature of the engine oil.

It should be observed that the control of the flaps 131 and 131' is independent of the control of the flap 143.

In a variant of the invention that is not shown, the control means 16, instead of having the elements 161 and 162, may have a cable, e.g. a Bowden cable, connected to the tab 132a and controlled mechanically, electromechanically, or pneumatically.

In another variant that is also not shown, an electric motor controls the pivoting of the shaft 132 about the axis $X_1$.

The assembly 10 is secured to the beam 21 by means of a plate 17 that is secured to said beam by screws 171 engaged in tabs 21a welded to the beam 21. A rod 173 provided with a central tapped hole 173a extends from the plate 17 away from the beam 21 and penetrates into an orifice 114 formed in the bottom 113 of the housing 11. Furthermore, a hole 133b is formed in the shell 133 and receives a screw 174 for engaging in the tapped hole 173a of the rod 173 after the air filter 12 and the module 13 have been put into place. Thus, by tightening the screw 174 in the rod 173, the assembly 10 is secured to the beam 21 in a manner that is particularly quick, the housing 11 being interposed and clamped between the elements 13 and 17. This facilitates operations of assembling the motorcycle 1, and also maintenance operations, since it suffices to loosen the screw 174 in order to gain access to the inside volume of the housing 11 and to the air filter 12, after removing the module 13.

In a variant, a screw of the same type as the screw 174 can be provided on the plate 17, with a corresponding tapped hole, of the type of the hole 173a being carried by the shell 133.

The bottom 113 of the housing 11 is pierced by a second orifice 115 surrounded by a sleeve 116 disposed on the face of the bottom 113 that faces towards the chamber $C_1$. When the housing 11 is mounted on the plate 17, the orifice 115 is disposed facing an opening 175 formed in said plate 17 such that a flow of air E' can pass through the orifice 115, as shown in FIG. 5, even when the flaps 131 and 131' are in the position for closing the openings 137 and 137'. This enables the engine 3 to be fed with combustion air while it is running slowly, i.e. at a speed such that the electromagnet 161 does not exert the force $F_7$ on the link 162.

The sleeve 116 serves to guide the flow E' towards the chamber $C_1$. The height $h_{116}$ of the sleeve 116 is selected as a function of the characteristics desired for the flow E'.

In a variant, a plurality of orifices of the same type as the orifice 115 can be provided in the bottom 113.

Because the orifice 115 and the opening 175 are disposed in the bottom portion of the assembly 10, the flow E' is a flow of air that is relatively hot since it comes from a zone close to the engine 3. This is favorable for the engine 3 when it is running slowly. In contrast, when the engine is running fast, the flow E through the openings 137 and 137' is a flow of cool air, which is likewise favorable in terms of combustion.

In addition, because of the volume of the chamber $C_2$, the assembly 10 can reduce the turbulence in the flow E compared with a flow of combustion air in a conventional motorcycle. The noise generated by this flow is thus reduced, thereby making it easier for a motorcycle fitted with the assembly 10 to be certified relative to the standards that are in force concerning noise.

The invention is described above for an engine having a carburetor. Nevertheless, the invention is also applicable to an engine fitted with an injector system.

The invention is described with two flaps 131 and 131'. Nevertheless, it can be applied with only one such flap.

The invention is described as having flaps 131, 131' and 143 that are pivotally mounted. Nevertheless, it can be applied with flaps or shutters that are slidably mounted respectively relative to the openings 137 and 137' and relative to the tube 14. Depending on the exact configuration of the tube 14, two shutters may be provided in the tube 142, one in each of the branches feeding a respective cylinder.

The invention claimed is:

1. An assembly for admitting combustion air into the engine of a motorcycle, the assembly comprising:
    an air filter;
    a tube for taking air from the air filter to the engine;
    a housing designed to be mounted in the top portion of the motorcycle and forming a support for the air filter;
    an air inlet module fitted to the housing and having at least one shutter movable between a first position in which it shuts an inlet for allowing air to flow towards an inside zone of the housing, situated upstream from the air filter, and a second position in which it allows air to flow into the air opening towards the inside zone of the housing;
    control means for controlling the movements of the shutter between its first and second positions; and
    assembly means for mounting the assembly at the top portion of the motorcycle;
    wherein the air filter is generally annular in shape, wherein, when it is disposed inside the housing, it subdivides the inside volume of the housing into a radially inner chamber and a radially outer chamber, wherein the radially inner chamber is fed with air through the air inlet module, and wherein the radially outer chamber forms around the air filter a chamber for stabilizing the flow of air downstream from the air filter.

2. An assembly according to claim 1, wherein the air filter is annular and subdivides the inside volume of the housing into two portions, namely said upstream zone situated radially inside the filter, and said stabilization chamber situated radially outside the filter.

3. An assembly according to claim 1, wherein the tube disposed between the stabilization chamber and the engine and it is fitted with at least one shutter movable between a first position in which it shuts the tube, and a second position in which it allows a flow inside the tube.

4. An assembly according to claim 1, wherein it includes means distinct from the air inlet module and enabling air to be fed to the inner zone even when the shutter of the air inlet module is in its first position.

5. An assembly according to claim 1, wherein the assembly means comprise means for holding the assembly securely on a beam of the frame of the motorcycle that is situated over the engine.

6. An assembly according to claim 5, wherein the assembly means include a plate suitable for being fitted on the beam and for supporting the housing fitted with the module.

7. An assembly according to claim 6, wherein the assembly means include a screw and a complementary tapped hole carried respectively by the air inlet module and by the plate, or vice versa, the screw and/or a member provided with the tapped hole extending through the upstream zone of the housing and enabling the module and the plate to be assembled together by screw-fastening, the housing being interposed between the module and the plate.

8. A motorcycle fitted with an air admission assembly according to claim 1, situated generally between the seat and the handlebar of the motorcycle, over the engine, the stabilization chamber being disposed generally symmetrically about a midplane of the motorcycle that is vertical in the utilization configuration.

9. A motorcycle according to claim 8, wherein the air inlet module is disposed on the top of the housing, with its opening(s) facing towards the front of the motorcycle.

10. A motorcycle according to claim 8, wherein the air admission assembly occupies substantially the volume occupied by the fuel tank of a conventional motorcycle.

* * * * *